United States Patent [19]
Ishida et al.

[11] Patent Number: 5,256,491
[45] Date of Patent: Oct. 26, 1993

[54] MOLDED ARTICLE OF CRYSTALLINE THERMOPLASTIC RESIN WITH HIGH GAS BARRIER PROPERTY AND PRODUCTION THEREOF

[75] Inventors: Takashi Ishida, Yokohama; Masato Kimura, Fujisawa; Tomonori Takahashi, Chigasaki, all of Japan

[73] Assignee: Nippon Petrochemicals Co., Ltd., Japan

[21] Appl. No.: 838,494

[22] Filed: Feb. 18, 1992

[30] Foreign Application Priority Data

Jun. 15, 1990 [JP] Japan .................. 2-157194

[51] Int. Cl.$^5$ .............................. B32B 27/00
[52] U.S. Cl. .................. 428/500; 428/474.4; 428/522; 428/910; 428/480; 264/164
[58] Field of Search .......... 428/510, 474.4, 480, 428/500, 522; 264/164

[56] References Cited

FOREIGN PATENT DOCUMENTS 51-52475  5/1976  Japan .
63-51092  10/1988  Japan .

Primary Examiner—Edith Buffalow
Attorney, Agent, or Firm—Ostrolenk, Faber, Gerb & Soffen

[57] ABSTRACT

In one aspect of the invention, there is provided a molded article of crystalline thermoplastic resin with high gas barrier property of which the resin has crystalline and non-crystalline regions, the enhancing effect on gas barrier property of uniaxial-uniplanar orientation of the crystal axis direction of crystallites of said crystalline regions being used and the crystallites orientation being optimized by specific conditions. In another aspect of the invention, the molded article of the first aspect of the invention is further annealed to increase the crystallinity of the crystalline regions. The molded articles in accordance with the present invention have excellent gas barrier properties, and they are not only useful as chilled beef packaging materials, but also useful for retort food packaging, pouch packaging, coating and protecting materials for ham and sausages, processed fish, processed seafood products such as boiled fish paste, dried food for sprinkling, soup powder, parched rice cake, curry powder, spices, vegetables, fruits and pharmaceuticals.

14 Claims, 12 Drawing Sheets

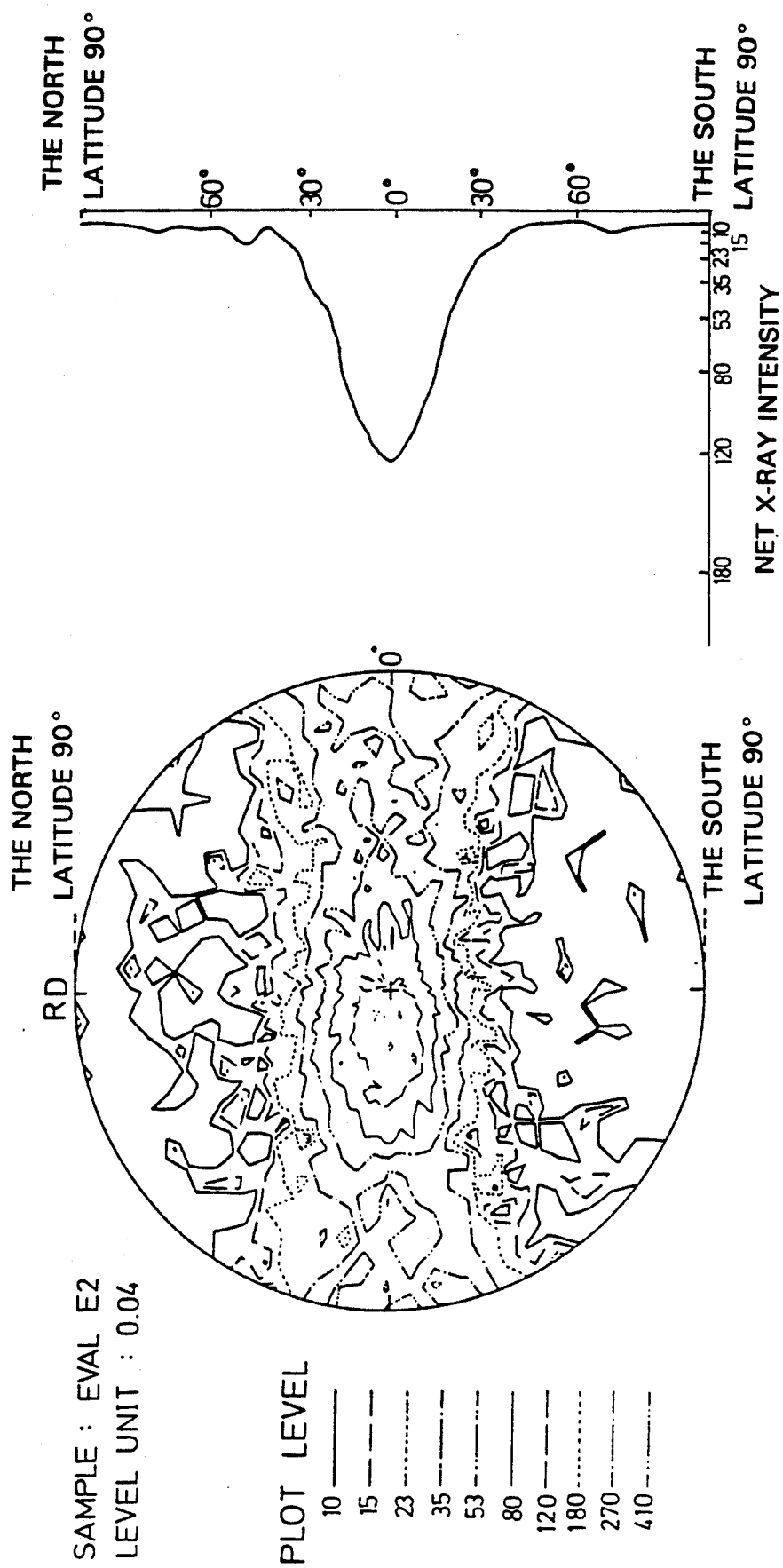

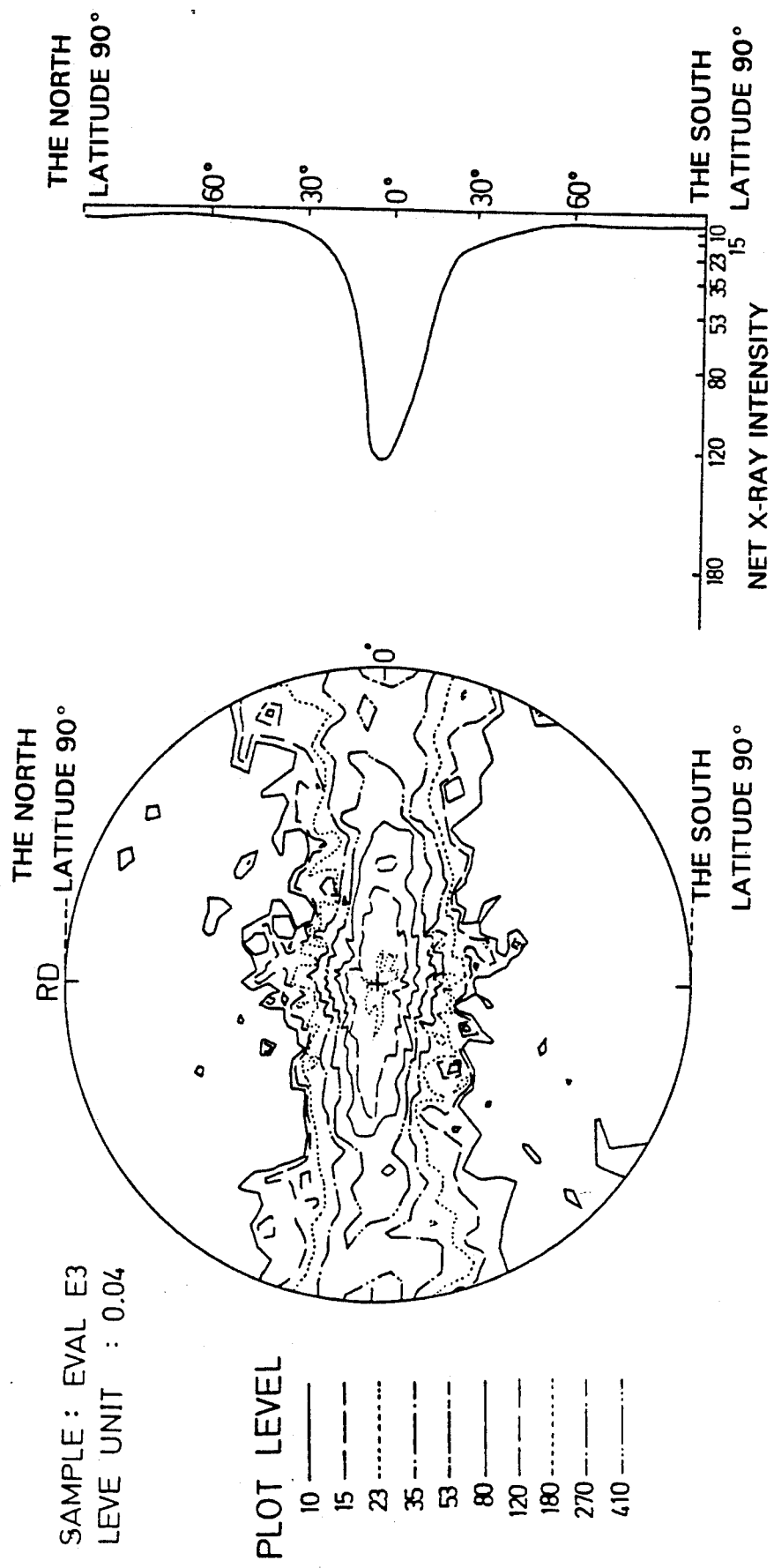

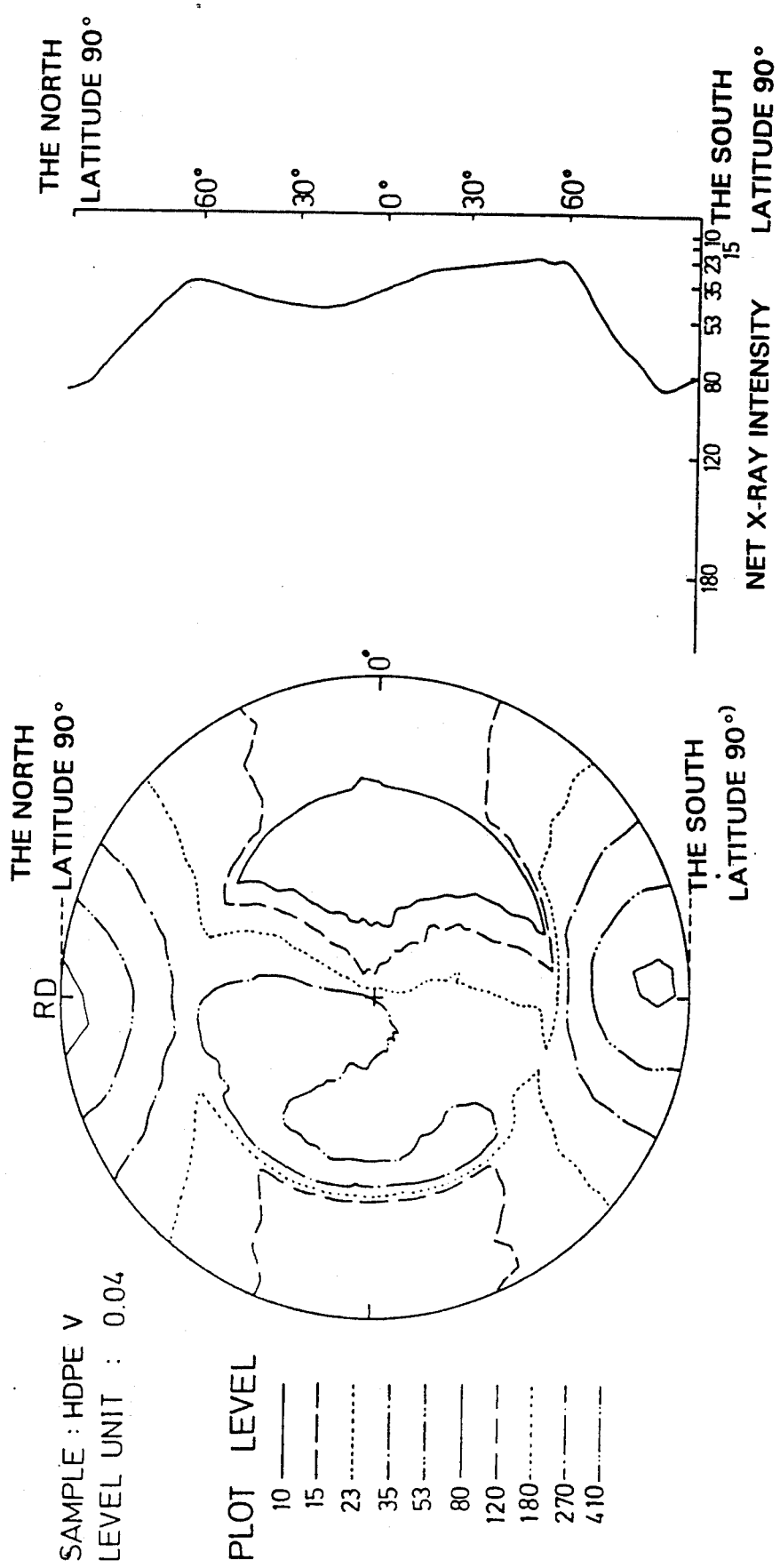

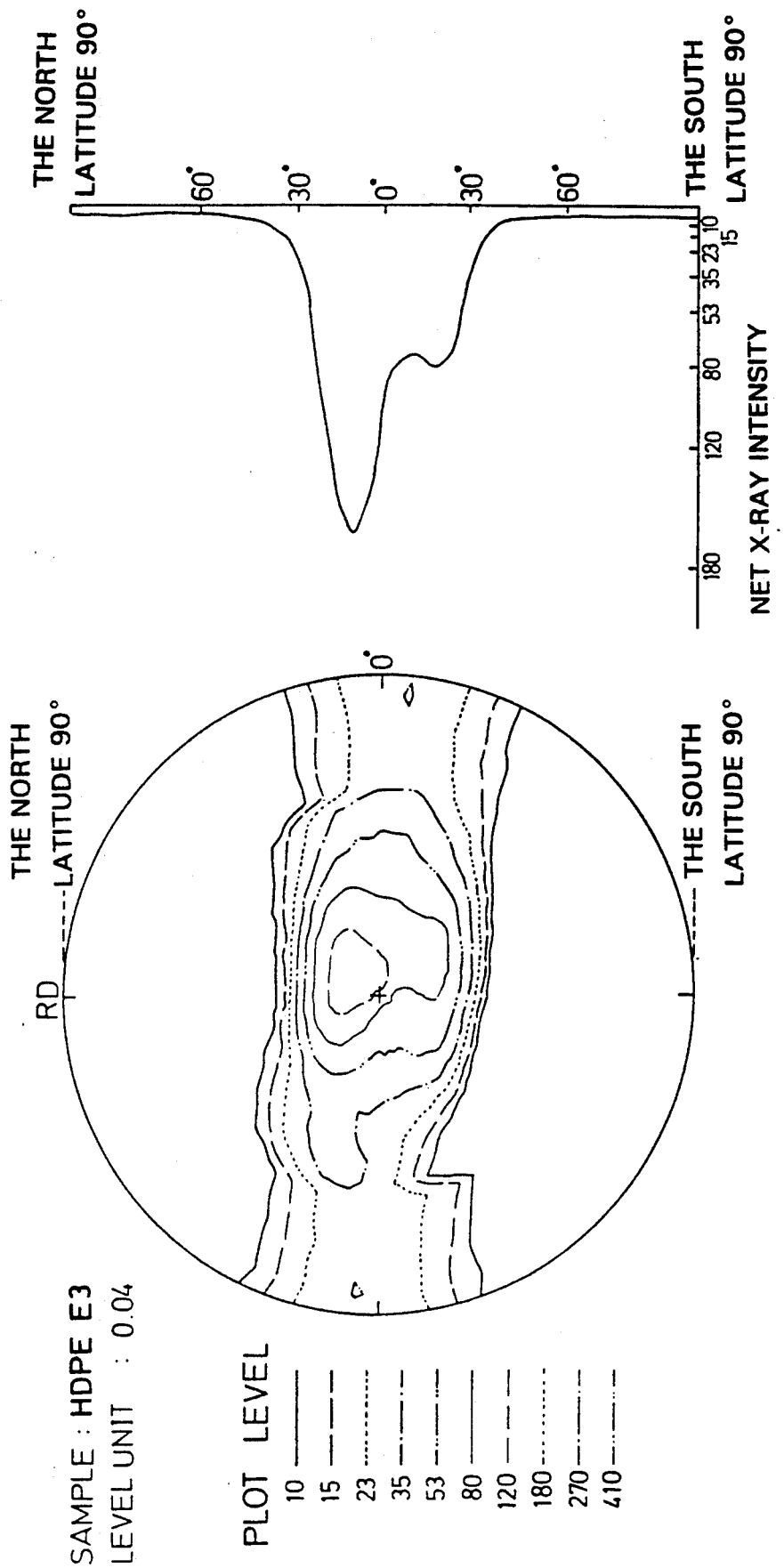

MOLDED ARTICLE OF CRYSTALLINE THERMOPLASTIC RESIN WITH HIGH GAS BARRIER PROPERTY AND PRODUCTION THEREOF

TECHNICAL FIELD

The present invention relates to molded articles of crystalline thermoplastic resins with high gas barrier properties which are suitably used for food packaging, parts packaging, covering and protection materials, and methods of making them.

BACKGROUND ART

So far films, sheets and other fabricates of resins having gas barrier properties have been used for food packaging, parts packaging, covering and protection materials, and the like. They are used as a substitute for conventional paper or cellophane because of their excellent processability, transparency, light weight, and low price. In recent years, there is a desire to enhance the gas barrier properties of such polymeric materials for film or sheet to a level of those of glass or metallic materials, for the sake of long term preservation of the contents.

For the purpose, ethylene-vinyl alcohol copolymer resins (EVOH), poly (vinyl alcohol) resins, polyamide resins, polyester resins, poly (vinylidene chloride) resins, and other crystalline thermoplastic resins have been used owing to their high gas barrier properties.

In such crystalline gas barrier resins, it is known that increasing crystallinity brings forth the improvement of the gas barrier property and that the application of drawing or rolling also improves the gas barrier property. In fact, these processes have been practiced.

However, the gas barrier properties of these conventionally obtained films and the like are not fully satisfactory, and it is desired to develop materials with higher gas barrier properties.

DESCRIPTION OF THE INVENTION

So far, it is generally accepted that the crystallinity is the most dominant factor for the gas barrier property of crystalline thermoplastic resins and that molding affects the barrier property through the changes of crystallinity.

Applicants made a detailed investigation on the interrelation between moldings such as drawing, rolling or annealing and the gas barrier properties of the molded articles, and have found that the gas barrier property of molded article of crystalline thermoplastic resins depends greatly on the crystallites, orientation in the molded articles.

Applicants have also found that the effect of crystallites orientation may be synergistic or cumulative with the effect of crystallinity, and succeeded by use of the both effects in obtaining molded articles having extremely superior gas barrier properties that have never been attained by conventional methods.

According to the present invention, both the crystallinity and the crystallites orientation govern the gas barrier properties of molded article of crystalline thermoplastic resins. Of these, the crystallinity has been well recognized hitherto. In crystalline thermoplastic resins, there exist crystalline regions where molecules pack regularly and compactly, and non-crystalline regions where molecular packing is somewhat irregular and less compact. In these crystalline regions, transmission of gas molecules is much more difficult owing to less free volume and more restricted molecular motion. Consequently, increasing the proportion of crystalline regions, that is, the increase in crystallinity results in the high gas barrier property.

On the other hand, the crystallites orientation has not been thoroughly discussed, although it is known that a film having better gas barrier property as compared with the original film is obtained by additional drawing or rolling process.

This improvement in the gas barrier property has been supposed to be due to raising the upper limit of crystallinity through crystallites orientation by molding, in other words, crystallites orientation has been supposed to contribute to the improvement in the gas barrier property through crystallinity.

Applicants made a detailed investigation on the relationship of two factors of crystallites orientation and crystallinity with gas barrier property, and have found that the effect of crystallites orientation is a different factor from that of crystallinity, that gas barrier property may not be improved by crystallites orientation alone, and that both effects are synergistic with each other, so that the combination of the two produces molded article of crystalline thermoplastic resins having excellent gas barrier properties. Moreover, it has now been found that various crystallites orientation patterns have comparative merits, and that an uniaxial orientation where a crystallographic axis orients in a direction while the orthogonal axis shows no selective orientation, is inferior to an uniaxial-uniplanar orientation where a crystallographic axis orients in a direction and in the direction perpendicular to said direction another orthogonal axis or plane exhibits orientation.

Applicants have further found that the degree of the uniaxial-uniplanar orientation should be beyond a certain level if enough enhancement of gas barrier property is to be desired. The present invention has been made on the basis of these findings.

It is accordingly an object of the present invention to provide a molded article of crystalline thermoplastic resin such as films, sheets, and containers having high gas barrier property by use of the enhancing effect of the uniaxial-uniplanar crystallites orientation, specifically of the synergistic enhancing effect of the uniaxial-uniplanar crystallites orientation and crystallinity on gas barrier property.

It is another object of the invention to provide an efficient method of making such molded articles economically.

According to a first aspect of the present invention, there is provided a molded article of crystalline thermoplastic resin with high gas barrier property wherein the resin has crystalline and non-crystalline regions, the crystal molecular chain axis direction of said crystalline regions orienting uniaxially and uniplanarly, and the crystallites orientation being optimized by the following (a) and (b):

(a) the degree of the uniaxial orientation of the crystal molecular chain axis direction is less than 60° in the half-height width of the longitudinal peak, and (b) the degree of the uniaxial-uniplanar orientation of the crystal plane which orients in the direction perpendicular to the molecular chain axis is more than 3 in terms of the equatorial intensity ratio, said crystal plane being characteristic of the individual resin.

According to a second aspect of the present invention, there is provided a molded article of crystalline thermoplastic resin with high gas barrier property, wherein said molded article of the first aspect of the present invention is further annealed to increase the crystallinity.

According to a third aspect of the present invention, there is provided a method of making molded article of crystalline thermoplastic resins of the first and second aspects of the present invention, said molded articles being characterized by having the following (a) and (b) characteristics: (a) the degree of the uniaxial orientation of the crystal molecular chain axis direction is less than 60° in the half-height width of the longitudinal peak, and (b) the degree of the uniaxial-uniplanar orientation of the crystal plane which orients in the direction perpendicular to the molecular chain axis is more than 3 in terms of the equatorial intensity ratio, said crystal plane being characteristic of the individual resin.

Said method comprises orienting uniaxially and uniplanarly the crystal molecular chain axis direction of the crystalline regions of the resin at a temperature lower than the melting point of the crystalline regions and higher than the glass transition point of the amorphous regions of the resin having crystalline regions and amorphous regions.

According to a fourth aspect of the present invention, there is provided a method of making molded article of crystalline thermoplastic resins with high gas barrier properties, wherein said method comprises increasing the proportion of the crystalline regions of the resin molded articles obtained in the third aspect of the resent invention in order to further increase the crystallinity of the resin.

The present invention uses the pole figure to quantitatively measure the degree of the uniaxial-uniplanar orientation of crystallites. By use of the wide angle x-ray diffraction method, orientations of crystallographic axis or planes can be determined stereoscopically and quantitatively.

Wide angle x-ray diffraction is widely used in the field of material science, and one of the popular experimental techniques. These are described, for example, in Japanese Patent Provisional Publication Nos. 53-129116, 62-240714, 2-86650, and Japanese Patent Publication No. 57-9418.

As for the experimental principle, reference may be held to the pertinent books. A typical one is "Shinpan Cullity x-ray Kaisetsu Yooron" (B. D. Cullity, translated by G. Matsunuma, Agune Co., 1982). Pole figure method is an application means of wide angle x-ray diffraction, and is widely used in investigation of crystalline materials, especially metallic materials. The applications to polymeric materials have increased rapidly in recent years, and an account of the technique has been described in authorized literatures of chemical experiments, such as "Shin Jikken Kagaku Kooza 19, Koobunshi-kagaku (II) (edited by Chemical Society of Japan, 1978).

The pole figure is a stereoscopic graph representing the intensity of diffracted x-ray by the crystallites examined. Pole figures are usually viewed as an indication of the crystallites orientation, but not so quantitative enough as to define the scope of the present invention.

Therefore, applicant has defined new parameters to describe the uniaxial-uniplanar orientation behavior indicated by pole figures.

In polymeric crystals, crystal planes represented by normals in the direction of molecular chain axis is apt to be inadequate for pole figure measurements because of the small spacing, and therefore parameters are defined on the basis of the pole figure of the crystal plane, the normal of which is orthogonal or nearly orthogonal to the molecular chain axis.

These are:
(a) the half-height width of the longitudinal peak, and
(b) the equatorial intensity ratio.

The former is defined as follows: The pole figure of the crystal plane the normal of which being orthogonal or nearly orthogonal to the molecular chain axis is measured and represented as the molded articled specimen with the surface parallel to the figure, and its molecular axis orientation direction in the vertical direction. Then, the net x-ray intensity along the circle of longitude zero is plotted against the latitude, and the width of the resultant peak near the equator is measured at the portion of the half peak-height. The width value is defined as the half-height width of the longitudinal peak.

The equatorial intensity ratio (b) is measured on the pole figure aforesaid as follows:

The net x-ray intensity along the equator is plotted against the longitude and the ratio, the maximum divided by the minimum is measured and defined as the equatorial intensity ratio.

The present invention concerns the molded article of crystalline thermoplastic resins having high gas barrier properties which are characterized by having the longitudinal half-height peak-width less than 60° and the equatorial intensity ratio more than 3, and more preferably concerns those having the longitudinal half-height peak width less than 40° and the equatorial ratio more than 4.

The crystalline thermoplastic resins used in the present invention are not limited. However, resins having high crystallinity and high orientation tendency upon molding are chosen preferably.

Typical examples of crystalline thermoplastic resins include ethylene-(vinyl alcohol) copolymer resins, poly(vinyl alcohol) resins, polyethylene resins, polypropylene resins, polyamide resins, polyester resins, poly(vinylidene chloride) resins, and mixtures thereof.

In the present invention, various additives such as an oxidation inhibitor, an ultraviolet absorber, a nucleating agent and a slip agent, a filler, a blend resin, and mixtures thereof may be added to the above-mentioned crystalline thermoplastic resin in so far as they do not deviate from the gist of the present invention.

The high gas barrier resin molded articles of the present invention can be used in various fields such as food packaging, parts packaging, covering materials, protection materials, and the like. One of the preferable forms of the molded articles for such uses is film or sheet.

A film or sheet in itself of the present invention may be used as a primary molded article, and the film or sheet after post-treatment may also be used as a secondary molded article. Typical examples of the secondary molded article include bags or containers which are made from the film through lamination and bag-making, and cups or trays which are made from the sheet through solid molding.

The present invention is applicable to all molded article the quality of which may be controlled with respect to the crystallites orientation through the molding method of the present invention. Consequently, it is applicable not only to film and sheet but also to pipe, drum, bottle and the like which are used for packaging, bottling, covering and protection.

The essential feature of the invention is to orient the crystallites in resin molded articles uniaxially and uniplanarly. The most important factor for the crystallites orientation is the big deformation during the molding process. Therefore, the design in melt or solid molding of resin to cause crystallites orientation is an effective means to obtain the molded article of crystalline thermoplastic resins having high gas barrier properties as mentioned above.

Post-molding to transform the molded articles into forms suitable to final uses, or post-treatment to improve the product quality may be adopted for making the final molded article of crystalline thermoplastic resins having high gas barrier properties.

In the second aspect of the invention, there is provided a molded article of crystalline thermoplastic resin with remarkably high gas barrier property, wherein the molded article is made by a method comprising making a primary molded article having uniaxial-uniplanar crystallites orientation followed by post-treating the primary molded article to increase the crystallinity.

As stated above, there are two factors affecting the gas barrier property of a crystalline thermoplastic resin, i.e. crystallites orientation and crystallinity. The first aspect of the present invention is to achieve the high gas barrier property by optimizing the elements of crystallites orientation. In this case, if crystallinity is increased at the same time through a post-treatment such as post-annealing, the gas barrier property can be further improved as a result of the synergistic effect of crystallinity and crystallites orientation. The second aspect of the invention is based on those facts.

In the annealing of molded article of crystalline thermoplastic resins, if the temperature of the resin is raised up to the crystalline melting point of the molded article, the advantageous crystallites orientation of the resin achieved by the primary molding disappear resulting in an adverse effect on the purpose of the present invention.

The crystal arrangement may be disturbed owing to the excessive molecular motion in the amorphous regions of the resin even at a temperature below the crystalline melting point of the molded article, for example, a temperature just below the melting point. Therefore, the preferable annealinq temperature to increase the crystallinity of the resin is more than 10° C. lower than the crystalline melting point of the resin.

Now, an example of the convenient and efficient methods of making molded article of crystalline thermoplastic resins of the present invention will be described in detail.

An efficient method for producing uniaxial-uniplanar crystallites orientation is as follows: a large elongational deformation of film is forced in a direction by large stress and second stress is applied simultaneously in the perpendicular (or nearly so) direction to the first one to prevent the width reduction accompanying the large elongational deformation.

Said method specifies the stress control conditions at the molding of the product having aforesaid (a) and (b) characteristics as claimed in the instant invention.

For example, it is well known that uniaxial crystallites orientation is produced by elongational deformation through large stress in a direction as is the case with fiber drawing. On that occasion, the cross section of elongated resin decreases in accordance with elongation, and roughly equal dimensions decrease in width and thickness.

Applicants investigated in detail the crystallites orientation caused by rolling, drawing between nearby rolls or biaxial drawing, and have found that if the second stress coplanar with the decreasing cross section due to elongational deformation is applied so as to hinder the dimension decrease, uniaxial-uniplanar orientation occurs instead of uniaxial orientation.

This findings is utilized for making molded article of crystalline thermoplastic resins with high gas barrier properties which have aforesaid characteristics (a) and (b) of the present invention.

It is desirable to control the width reduction in the second direction less than $\frac{1}{2} \times 1/(n^{\frac{1}{2}})$ (n:draw ratio or rolling ratio in the first direction).

The most preferable methods for achieving such uniaxial-uniplanar crystallites orientation are selected from the group consisting of one-directional rolling, drawing between nearby rolls and biaxial drawing.

These methods are the simplest molding methods for the production of the molded article of crystalline thermoplastic resins having uniaxial-uniplanar crystallites orientation of the present invention.

In one-directional rolling, elongation deformation in machine direction and dimension decrease in thickness direction are effected, while width reduction is strongly hindered.

In drawing between nearby rolls, elongational deformation is effected in machine direction between nearby rolls which revolve at quite different speeds. Under these circumstances, the film or sheet to be drawn keeps in contact with either roll, thus the width reduction is minimized.

In the case of simultaneous biaxial drawing, the extension ratios in two directions are set quite differently, thus elongational deformation is effected in the direction with a high extension ratio, while the width reduction is hindered in the other direction with a low extension ratio. As to achieving the uniaxial-uniplanar orientation, the extension ratio in the second direction need not be necessarily over 1. Although a ratio which equals 1 means no dimension variance and ratio below 1 means shrinkage, as far as the extension in the second direction minimizes the width-reduction accompanying the large elongational deformation, it is effective for producing uniaxial-uniplanar orientation. Therefore, the simultaneous biaxial drawing as defined by the present invention includes the cases where the extension ratios in the second direction are equal to 1 or less than 1.

Bearing in mind the consideration about the mechanism of the invention described hitherto, it will be readily understood that the molding conditions should be confined to the specified pertinent range in order to make the molded articles of the present invention.

That is, the molding conditions should conform to the followings:

1. It should stretch amorphous tie molecules.
2. It should result in the uniaxial-uniplanar orientation through the rotation of crystallites.
3. It should not lower the crystallinity.

Molding Temperature

Consequently, the molding temperature should be lower than the melting point of the crystalline regions and higher than the glass transition point of the amorphous regions. The molding with rolls at higher temperatures than the melting point of the crystalline regions is well-known in such a case as a conventional process, "Rolltrusion". However, this is entirely useless for the object of the present invention, because the extension at temperatures where all crystalline regions are molten produces no crystallites orientation, that is, no crystallites exist under the molding conditions and crystallites reappear after cooling.

On the other hand, the molding at lower temperatures than the glass transition temperature of the amorphous regions, does not produce satisfactory molecular stretching of the molecules, due to the reduced flexibility of molecules in the amorphous regions.

As a result, the molding at too high or too low temperatures does not produce the enhancement of gas barrier properties. Between the melting point and the glass transition temperature, the high temperature is preferred on account of the easiness of the molding. However, the melting points of polymeric materials are not clear as compared with those of low molecular weight materials, and thus a part of crystallites begins to melt at temperatures below the melting point. From these reasons the molding should be preferably carried out at the temperature about 10° C. lower than the crystallization temperature.

Extension Ratio the preferable range in the extension ratio can be argued similarly. The microscopic deformation mechanism of the crystalline (strictly speaking, semi-crystalline) resin is composed of the deformation (relaxation to stretching) of the amorphous regions, the rotation and the reorientation of the crystalline regions, the shear deformation (tilting) of the crystalline regions, the molecular slip of tie molecules from the crystalline regions, the separation or segregation of the crystalline regions, and the like. Although the sequential order of these microscopic processes depends on the temperature, the order generally follows the cited order at temperatures between the melting point and the glass transition temperature of the resin. In the present invention, it is most desirable to realize just enough the first two microscopic deformation, i.e., the stretching of molecules in the amorphous regions and the rotation-reorientation in the crystalline regions. Consequently, the insufficient extension ratio will result in the insufficient rotation in the crystalline regions, which leads to the unsatisfactory gas barrier property even after the post-annealing. On the other hand, the excessive extension ratio will start the molecular slip of amorphous molecules from the crystalline regions and the segregation of crystallites, which will lead to finer crystallites and lower crystallinity. These are quite detrimental to the enhancement of the gas barrier property which the present invention aims.

It is difficult to specify the preferable range of the extension ratio concretely because the inclination for orientation upon extension, in other words, the sequential order and the extent of microscopic deformations are greatly dependent upon individual resins. Furthermore, as they are also influenced by the molding temperatures, the same resin has the different preferable extension ratios at different temperatures. As will be understood by the foregoing explanation, the essential point is to realize both the stretching of amorphous molecules and the uniaxial-uniplanar orientation of crystallites, and not to extend the resin to any specified range.

Stress Condition

In order to produce the uniaxial-uniplanar orientation of crystallites, the molding processes are confined to those which realize special stress conditions. The unidirectional rolling process is one of the most preferable processes.

In order to produce the uniaxial orientation of crystallites, it is well known to effect an uniaxial elongational deformation. However, through such an uniaxial stress condition, only molecular chain axes are aligned in the direction of the elongational deformation, and each molecular chain still has the freedom of rotation around its own axis. As a result, the surfaces of crystallites do not conform with each other, which is unfavorable to the enhancement of the gas barrier property through annealing.

In order to produce the uniaxial-uniplanar orientation as defined in the invention, at the same time as an unidirectional elongational deformation, the second stress should be applied in the direction perpendicular (or nearly perpendicular) to the above elongation. This second stress should not be strong enough to disturb the alignment of molecular chain axes in the first direction, and should be strong enough to restrict the rotation around the molecular chain axis. Considering that the crystallites orientation is caused by the microscopic deformation, the criteria had better be based, not on the stress but on the strain. Practically speaking, there should be the elongational deformation in the first direction where molecular chain axes align. That accompanies the decrease of the cross-section perpendicular to the first direction. Usually, this decrease of the cross section is indifferent of the directions, but it is the point of the present invention that the dimension reduction in a second direction is made much smaller than the other. According to this, the strains in three orthogonal directions will be elongation, no or little strain, and dimension reduction respectively, and this produces the uniaxial-uniplanar orientation of crystallites, in which the specific crystal axes align in the respective orthogonal directions.

The unidirectional rolling process where enough tightening force is applied to suppress the width reduction, is expected to realize the aforesaid strain conditions.

Drawing between nearby roles is also effective to release the similar strain or stress condition, because the width reduction of film is hindered by film adhering with very closely spaced rolls. Similarly in the biaxial drawing, if the extension in one direction is large and the extension ratio is the second direction is kept nearly one (in other words, no strain), the desirable strain condition is realized. However, as no elongation deformation in the second direction exists, calling this as biaxal drawing would be inadequate in the sense of terminology. Biaxial drawing is used herein on the ground that the dimension decrease accompanying the elongation in the first direction is suppressed by the second stress as is the case with biaxial drawings. Considering the points of the present invention as mentioned above, it is readily understood that the stress in the second direction should be applied in order to achieve no strain. It should be determined experimentally. Specifying numerical values for the stress is impossible, because the stress depends on the viscoelastic as well as the plastic behavior of resins and so is dependent on resins and temperatures.

BRIEF DESCRIPTION OF THE DRAWINGS

FIGS. 6(a) and (b)–10(a) and (b) show the (200) pole figures of HDPE films, measured by wide angle X-ray diffraction method.

DETAILED DESCRIPTION OF THE PREFERRED EMBODIMENTS

Figures 1A, 1B:
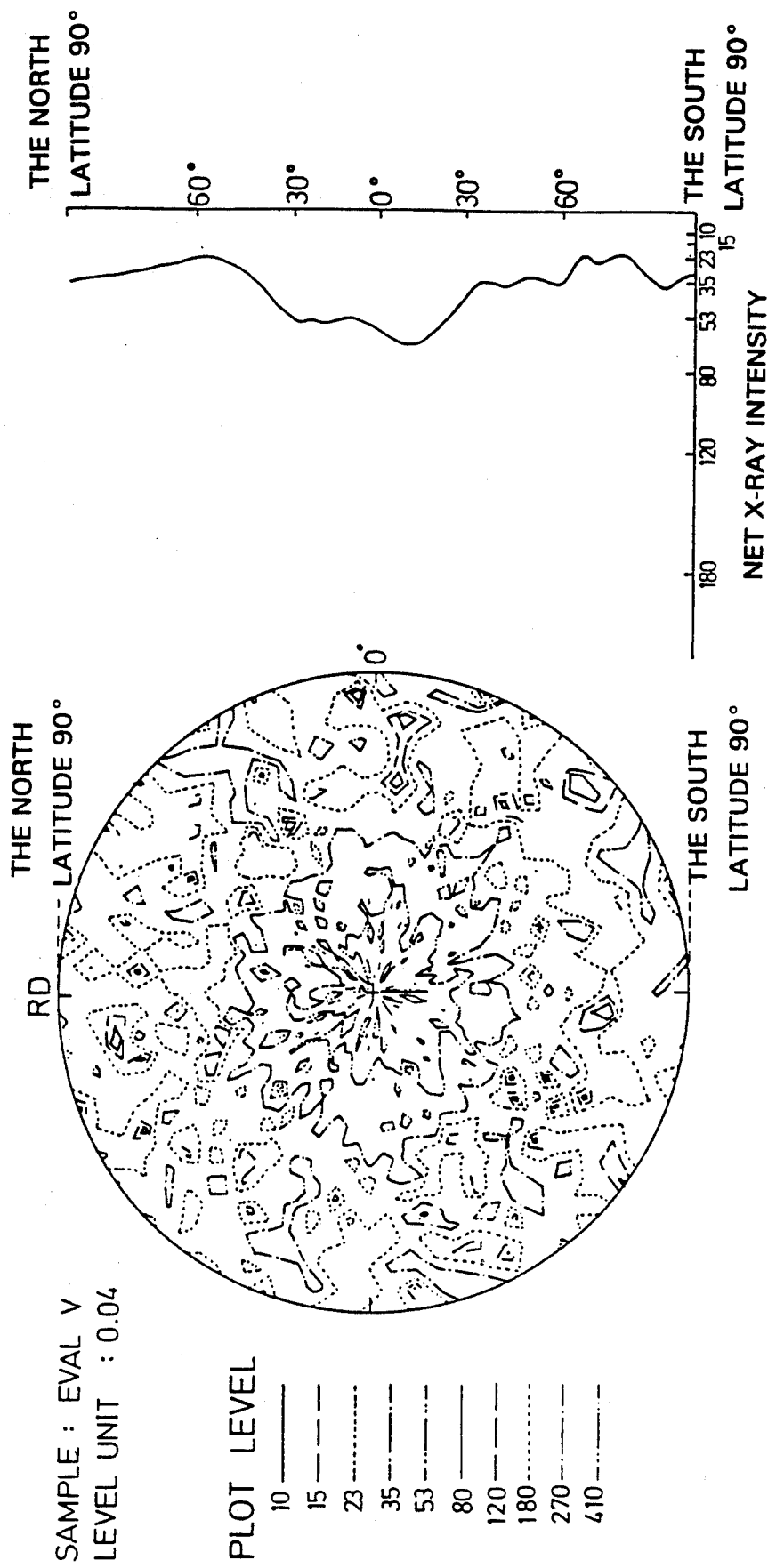
FIGS. 1(a) and (b)–5(a) and (b) show the (110) pole figures of EVOH films, measured by wide angle X-ray diffraction method.

The present invention will be further described in conjunction with preferred embodiments.

Effect of Crystallites Orientation in EVOH

Effect of crystallites orientation in EVOH is discussed in Examples 1–3 and Referential Examples 1–2.

EVOH is known to be one of the resins having highest oxygen barrier properties and is widely used for food packaging and the like.

The efficacy of the invention is evaluated in terms of oxygen transmission rate.

Preparation of EVOH Specimen

Specimens of Examples 1–3 and referential Examples 3 were prepared as follows: The sample of Referential Example 1 was a extruded cast film itself, and the other specimens were prepared by the additional application of rolling or drawing between nearly rolls to the above cast films.

Extrusion into Cast Film

Two multilayer coextruded cast films were prepared, the one for extension by 3 times, and the other for extension by 2 times. The multilayer structures are shown below.

| structure | inner layer | center layer | outer layer |
| --- | --- | --- | --- |
| material | LDPE | EVOH | LDPE |
| By 3 times | 30 μm | 45 μm | 30 μm |
| By 2 times | 20 μm | 30 μm | 20 μm |

EVOH resin used was EP-F101 (trade name; made by Kuraray Co.,)(ethylene 32 mole %, melt flow index 1.6).

The films were subjected to secondary molding to peel off unnecessary or interfering LDPE layers before the measurements of wide angle x-ray diffraction and the like.

Unidirectional Rolling
(Used rolls)

| | | |
| --- | --- | --- |
| working length of rolling-heating rolls | | 500 mm |
| diameter of rolling-heating rolls | | 250 mm |
| total contact length at preheating rolls | | 1000 mm |
| (Molding conditions) | | |
| extension ratio | 2 | 3 |
| circumferential speed of preheating rolls (m/mm) | 3 | 2 |
| temperature of preheating rolls (°C.) | 70 | 70 |
| circumferential speed of rolling rolls (m/mm) | 6 | 6 |
| temperature of rolling rolls (°C.) | 90 | 90 |
| tightening force (Kg/cm) | 260 | 320 |
| width reduction (%) | ▽7 | ▽7 |
| Drawing between nearby rolls | | |

-continued

| | | |
| --- | --- | --- |
| (Used rolls) | | |
| working length of rolling-heating rolls | | 500 mm |
| diameter of drawing-heating rolls | | 250 mm |
| distance between nearby rolls | | ca. 2 mm |
| total contact length of preheating rolls | | 1000 mm |
| (Molding conditions) | | |
| extension ratio | 2 | 3 |
| circumferential speed of preheating rolls (m/min) | 3 | 2 |
| temperature of preheating rolls (°C.) | 90 | 90 |
| circumferential speed of slow revolve. rolls (m/min) | 3 | 2 |
| temperature of slow revolve. rolls (°C.) | 90 | 90 |
| circumferential speed of high revolve. roll (m/min) | 6 | 6 |
| temperature of high revolve. roll (°C.) | 90 | 90 |
| width reduction (%) | ▽16 | ▽18 |

Measurement of Crystallites Orientation

EVOH is known to belong to varied crystal systems in accordance with the copolymerized ethylene content, but the resins used in Examples 1–3 and Referential Examples 1–2 were of monoclinic crystal system. Although there are several crystal planes of which the normals are orthogonal or nearly orthogonal to the molecular chain axis, as was defined in the present invention, those which are easy to measure are limited, such as 110) and (110) planes. As plane spacings of these two crystal planes are very close wlith each other, only one overlapped diffraction pattern was observed unless the as annealed. In the cases of Examples 1–3 and Referential Examples 1–2, pole figures of these two crystal planes were used to characterize the crystallites orientation and conveniently called as (110) pole figures.

To the right of each pole figure, the profile along the longitude 00 is presented.

Referential Examples 1 to 2 and Examples 1 to 3

Referential Example 1 concerns extrusion-cast EVOH film, and the crystallites orientation was so weak that both the longitudinal half-height width and the equatorial intensity ratio were out of the question, as was shown by the (110) pole in FIG. 1.

Referential Example 2 concerns the film which was 2 times elongated with the drawing between nearby rolls based on the original film (Referential Example 1), and the longitudinal half-height width was 36°, and the equatorial intensity ratio was 2, as was shown by the (110) pole figure in FIG. 2.

Example 1 concerns the film which was elongated by 3 times with the drawing between nearby rolls based on the original film (Referential Example 1). The measurement of wide angle x-ray diffraction revealed the longitudinal half-height width as 32° and the equatorial intensity ratio as 3. Thus, this film was within the scope of the present invention. The (110) pole figure of Example 1 is shown in FIG. 3.

Figures 4A, 4B:
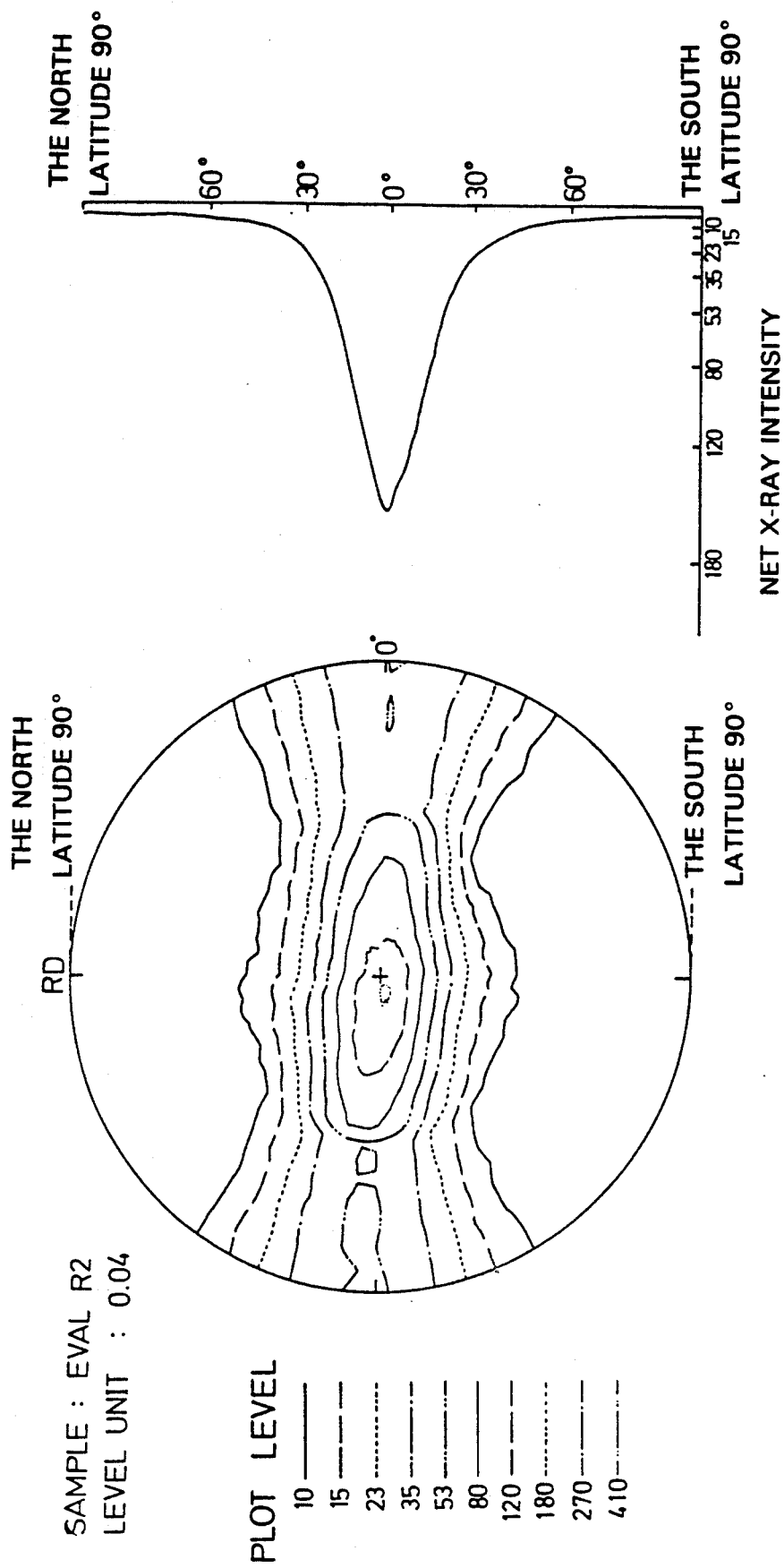

Example 2 concerns the film rolled to extension ratio of 2 on the basis of the original film (Referential Example 1), and the longitudinal half-height width was 32°, and the equatorial intensity ratio was 3, which is comprised in one of the claims of the invention. The (110) pole figure of Example 2 1 is shown in FIG. 4.

Figures 5A, 5B:
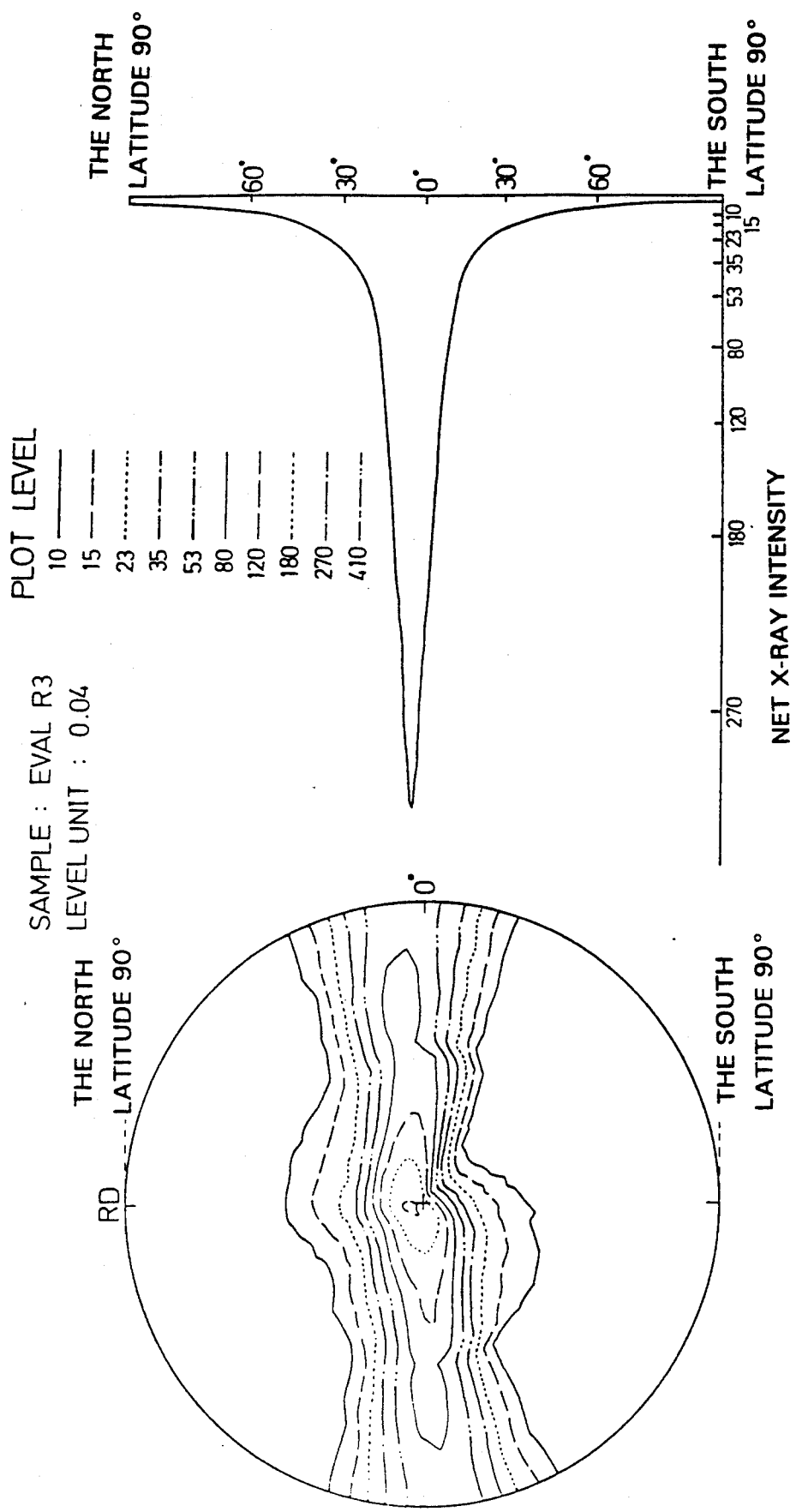

Example 3 concerns the film rolled to extension ratio of 3 on the basis of the original film (Referential Example 1), and the measurement of wide angle x-ray diffraction revealed the longitudinal half-height width as 20° and the equatorial intensity ratio as 5. This is the preferable EVOH film of the present invention. The (110) pole figure of Example 3 is shown in FIG. 5.

Oxygen transmission rates of these films are set forth in Table 1.

TABLE 1

Crystallites Orientation and Oxygen Permeation Rates of EVOH Films

| | Longitudinal Half-height Width (°) | Equatorial Intensity Ratio | Orientation Degree *2 | Post-Fabrication | Oxygen Permeation Rate *1 |
|---|---|---|---|---|---|
| Referential Example 1 | — | — | x | None | 680 |
| Referential Example 2 | 36 | 2 | x | elongated by 2 times, drawing between nearby rolls | 265 |
| Example 1 | 32 | 3 | ○ | elongated by 3 times, drawing between nearby rolls | 122 |
| Examle 2 | 32 | 3 | ○ | rolling 2 times | 138 |
| Example 3 | 20 | 5 | ⊚ | rolling 3 times | 57 |

*1 (cc·10μ/m²·arm-day) (30° C.-100% RH)
*2 ⊚: Preferable
○: Within the scope of the invention
x: Out of the question

Measurement of Oxygen Transmission Rate

Figure 11:
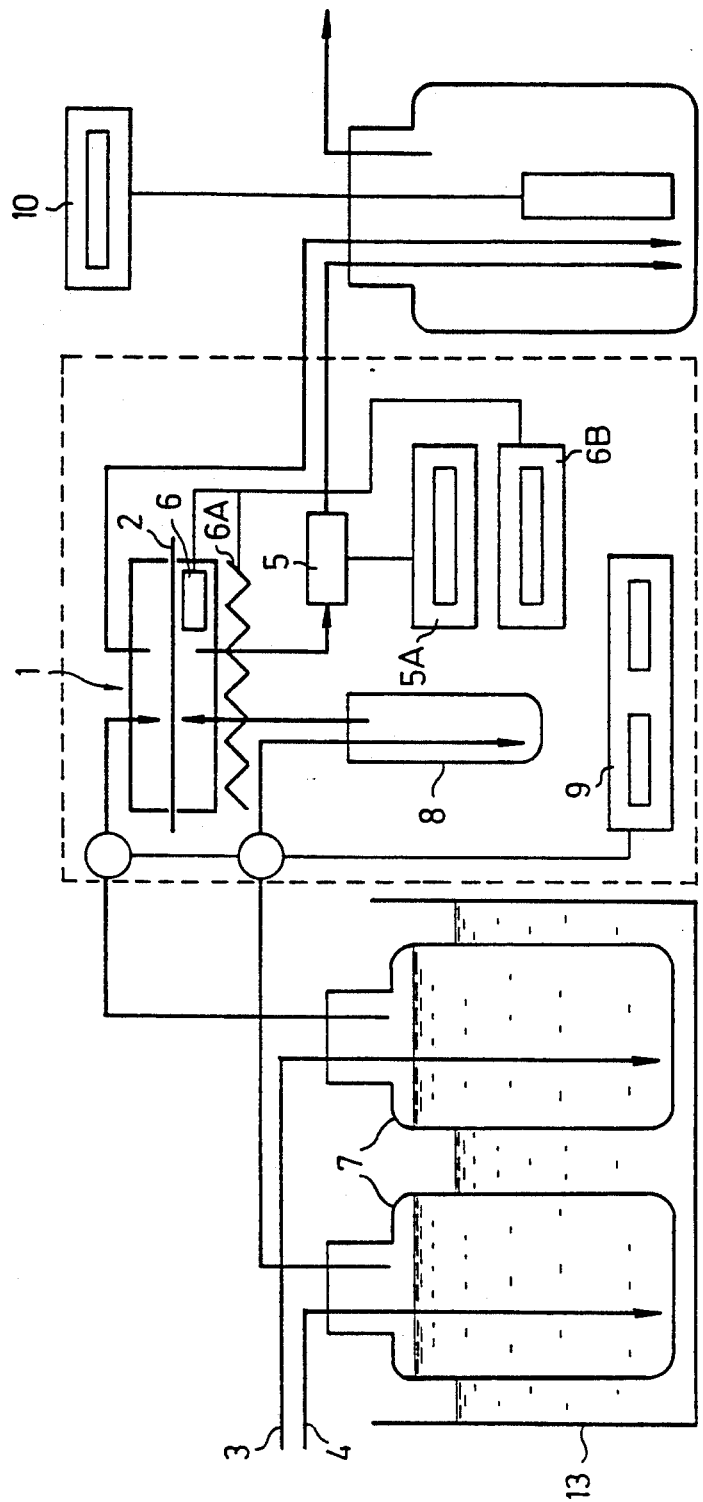
FIG. 11 shows the schematic diagram of OX-TRAN.

Oxygen transmission rates were measured by use of OX-TRAN (trade name; made by MOCON Co.,). The apparatus is reliably used for the determination of oxygen transmission rates of plastic packages or containers. FIG. 11 gives a schematic diagram of OX-TRAN.

Sample film 2 was set in the measuring cell 1, and oxygen gas 3 and nitrogen gas 4 were introduced into the upper and lower chamber of the cell respectively.

Oxygen permeates through the film from the upper to the lower chamber due to the difference in oxygen partial pressures, and the permeation can be measured as the oxygen concentration in the gas leaving the lower chamber (5:oxygen sensor, 5A: oxygen analyzer).

As oxygen permeation rate or oxygen transmission rate is dependent on temperature and humidity, OX-TRAN is provided with a heater 6A and a temperature controller 6B to keep the cell temperature constant.

Humidity is regulated as follows: both oxygen and nitrogen are saturated with water vapor at a water trap 7 in a thermostat 13 held at a temperature of T1 (lower than the cell temperature T2) before entering the cell. As the absolute water vapor concentration does not change, the saturated vapor at T1 will result in the unsaturated one at T2 under the constant relative humidity. The numeral 8 is an oxygen-removing trap, 9 is a flow-controller and 10 is a hygrometer.

Figure 12:
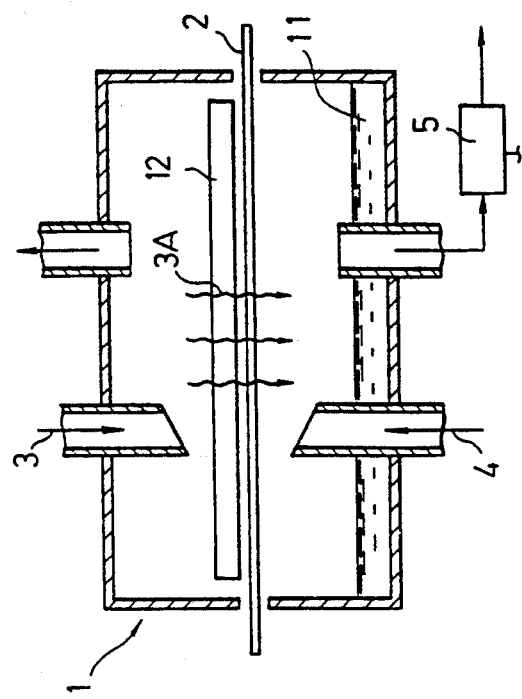
FIG. 12 is the enlarged diagram of the measuring cell of OX-TRAN.

The measurements were made at 30° C. and at wet film condition. Before taking measurements, sample films were fully soaked in water at 30° C. in a thermostat, and water 11 was placed in the lower chamber during the measurement as shown in FIG. 12, and wet tissue paper 12 was placed upon the sample film. The cell temperature and the humidity of gas streams were kept at 30° C. and 90% RH respectively. Arrows 3A in FIG. 12 shows permeation of oxygen.

Evaluation

The film with little crystallites orientation in Referential Example 1 showed a high oxygen transmission rate of 680 (cc·10μ/m².atm.day).

As oxygen transmission rates of polyethylene films are generally from 3000 to 8000 (cc·10μ/m².atm.day), the above value manifests the superiority of EVOH as an oxygen barrier. However, the values of this level are not satisfactory for food packaging use.

The film in Referential Example 2 showed oxygen transmission rate of 265 (cc·10μ/m².atm.day), about one half of that of Referential Example 1 film, but the improvement was still unsatisfactory.

The film in Example 1 which was drawn 3 times between nearby rolls and with the longitudinal half-height width of 320 and the equatorial intensity ratio of 3, showed oxygen transmission rate of 122 (cc·10μ/m².atm.day), about 1/5 of Referential Example 1.

This is a substantial improvement in barrier property, corresponding to about 1/20 to 1/80 of polyethylene films.

It is the merit of the present invention to achieve such a good gas barrier without the help of annealing.

In Example 2 in which the film with the longitudinal half-height width of 32° and with the equatorial intensity ratio of 3 was obtained by rolling to extension ratio 2, the oxygen transmission rate was 138 (cc·10μ/m².atm.day), which is about 1/5 of the original film and roughly equivalent to Example 1 film. This is also a useful film having good gas barrier property.

In Example 3, the preferable film defined in the present invention, namely the film with the longitudinal half-height width of 20° and the equatorial intensity ratio of 5, showed the oxygen transmission rate of 57 (cc·10μ/m².atm.day), less than 1/10 of the film in Referential Example 1. Achievement of such a excellent gas barrier without the help of annealing is unprecedented.

Synergistic Effect of Crystallites Orientation and Annealing in EVOH

Annealing for Crystallization Promotion

EVOH films described in Referential Example 1 and Example 3 were subjected to annealing in a thermostatted air bath for prescribed periods of time. On annealing, films were in fixed state in order to avoid warpage through heat shrinkage or relaxation of crystallites orientation.

Referential Examples 3 to 5 and Examples 4 to 6

In Referential Example 3, the sample was an annealed EVOH film: the original film (Referential Example 1) was treated at 120° C. for 1 hour.

In Referential Example 4, the sample was an annealed EVOH film: the original film (Referential Example 1) was treated at 140° C. for 1 hour.

In Referential Example 5, the sample was an annealed EVOH film: the original film (Referential Example 1) was treated at 160° C. for 6 hours.

In Example 4, the sample was an annealed EVOH film: the EVOH film (Example 3) was treated at 120° C. for 1 hour.

In Example 5, the sample was an annealed EVOH film: the EVOH film (Example 3) was treated at 140° C. for 1 hour.

In Example 6, the sample was an annealed EVOH film: the EVOH film (Example 3) was treated at 160° C. for 6 hours.

As the melting point of EVOH is 170°–180° C., annealing over said range is unpractical. EVOH is known to be a resin having high crystallization rate, and the annealing at 160° C. for 6 hours may be assumed to bring about practically maximum crystallinity. The oxygen transmission rates of the films in Referential Examples 3–5 and Examples 4–6 were set forth in Table 2.

TABLE 2

Annealing and Oxygen Permeation Rates of EVOH Films

| | Annealing Conditions *2 | Oxygen Permeation Rate *1 |
|---|---|---|
| Referential Example 1 | | 680 |
| Referential Example 3 | Referential 1 + 120° C. annealing | 135 |
| Referential Example 4 | Referential 1 + 140° C. annealing | 120 |
| Referential Example 5 | Referential 1 + 160° C. annealing | 52 |
| Example 3 | | 57 |
| Example 4 | Example 3 + 120° C. annealing | 15 |
| Example 5 | Example 3 + 140° C. annealing | 14 |
| Example 6 | Example 3 + 160° C. annealing | 13 |

*1 (cc.10μ/m²-atm-day) (30° C.-100% RH)
*2 treating time: 1 hr. at 120° C. or 140° C., 6 hrs. at 160° C.

Evaluation

The films in Referential Examples 3–5 were all annealed films on the basis of the original film having no appreciable crystallites orientation. They showed the oxygen transmission rates of 135, 120 and 52 (cc.10μ/m².atm.day), the improvements were definite and assumed to be due to crystallinity increase.

The oxygen transmission rate of the film in Referential Example 5 with annealing at 160° C. for 6 hours was excellent, and it was in fact realized by the conventional annealing technology. However, such long annealing is impractical in commercial continuous process for making films or sheets, and batchwise annealing is also impractical because of difficulty to maintain the form against heat shrinkage. On the contrary, the molding of the present invention is much more practical from economics and equipment viewpoints. Making use of molding solely, Example 1 and 2 realized the excellent gas barrier properties comparable with Referential Examples 3 and 4, and Example 3 comparable with Referential Example 5 which was achieved by commercially impractical annealing.

Example 4 was achieved by post annealing at 120° C. for 1 hour on the basis of Example 3 with the achievement of the present invention, namely the crystallites orientation effect. The oxygen transmission rate of Example 4 was actually 15 (cc.10μ/m².atm.day), which was a very excellent gas barrier property unrealizable by the conventional annaling effect only.

By applying post annealing at 140° C. for 1 hour to the sample in Example 3, the sample in Example 5 was prepared which showed the oxygen transmission rate of 14 (cc.10μ/m².atm.day). The sample prepared by the post annealing at 160° C. for 6 hours showed the transmission rate of 13 (cc.10μ/m².atm.day). These were the films having extremely excellent gas barrier properties.

Examples 4–6 are the realization of the present invention in the manner of combination of optimized crystallites orientation and post annealing. By comparing these Examples with Referential Examples in Table 2, the following important knowledge can be obtained.

That is, in Referential Examples 3–5 where there exists the combination of little crystallites orientation (Referential Example 1) and post-annealing, the severer the annealing, the better the gas barrier properties. On the contrary, the combination of optimized crystallites orientation (Example 3) and post annealing yielded the products having almost equally good gas barrier properties (Examples 4–6). That is, the sample in Example 4 with rather mild annealing at 120° C. for 1 hour was almost equivalent in gas barrier performance to the sample in Example 6 with much severer annealing at 160° C. for 6 hours.

For the above, it can be concluded that the crystallites orientation effect of the present invention not only improve the gas barrier property or cooperate with the conventional crystallinity effect, but also makes it possible to lessen the severity of post-annealing.

Evidence of Independence of Crystallites Orientation Effect

The crystallites orientation effect of the present invention is independent from the conventional crystallinity effect. The evidence is as follows:

A simple technique for measuring crystallinity is the the measurement of density. It makes use of the fact that the density of the crystalline regions is higher than that of the non-crystalline regions. In consequence, the higher the crystallinity (the proportion of the crystalline regions) the higher the density.

Density Measurement Method

Density was measured by use of density-gradient tube method. A density-gradient tube was constructed by pouring into a glass tube liquid mixtures of gradually changing compositions of two miscible liquids having different densities. Samples were put into the tube and the densities were determined from the floating positions of the samples.

Table 3 gives the measured densities of the samples in Referential Example 1 and Example 3 which underwent no annealing, and the sample in Comparative Example 5 and Example 6 which were annealed at 160° C. for 6 hours. For comparison purpose, the oxygen transmission rate data are also provided.

TABLE 3

Densities and Oxygen Permeation Rates of EVOH Films

| | Post-fabrication and Post-Treatment | Densities (g/cc) | Oxygen Permeation Rates *1 |
|---|---|---|---|
| Referential Example 1 | None | 1.132 | 680 |
| Example 3 | Rolling + None | 1.138 | 57 |
| Referential Example 5 | None + Annealing | 1.157 | 52 |
| Example 6 | Rolling + Annealing | 1.159 | 13 |

*1 (cc-10μ/m²-atm-day) (30° C.-100% RH)

Evaluation

The samples in both Comparative Example 1 and Example 3 which underwent no annealing had densities of 1.13 level, and Referential Example 5 and Example 6 which were fully annealed had densities of 1.15 higher level. This clearly demonstrates that densities are affected greatly by annealing but hardly by molding.

Comparing Example 3 with Referential Example 1, the densities are nearly equal, but the gas barrier properties are quite different, almost 12 times different. This demonstrates that Example 3 owes the gas barrier property much to the factor other than crystallinity.

Likewise, comparing Example 6 with Referential Example 5, they have nearly equal densities, but quite different gas barrier properties, as large as 4 times different. This clearly demonstrates that Referential Example 5 depends on the crystallinity effect and Referential Example 6 depends on the crystallinity effect plus another effect.

Said another effect which cooperates with crystallinity is the crystallites orientation effect aforesaid.

Crystallites Orientation Effect in HDPE

Examples 7-9 and Referential Examples 6-7 were provided to show the crystallites orientation effect in high density polyethylene resin (HDPE), the most representative crystalline thermoplastic resin. As polyethylene has no polar group and is hydrophobic by nature, water vapor transmission rate (WVTR) is the most practically important gas barrier property. Therefore, the effectiveness of the invention was evaluated in terms of WVTR in the Examples and Referential Examples concerning HDPE.

Preparation Method of HDPE films

Five sample films used in Referential Examples 6-7, and Examples 7-9 were HDPE films having various degrees of crystallites orientation, which were molded articled by drawing between nearby rolls or by rolling process on the basis of an identical original film (Referential Example 6).

Original Film Preparation

Using HDPE resin (trade name E710; made by Nippon Petrochemicals Co., Ltd.)(melt flow index 1.0, density 0.956, 100 μm thick) was prepared by an extrusion blown film method and the resultant tubular film was slit open to the pertinent width.

| Unidirectional Rolling | | |
|---|---|---|
| (Used Rolls) | | |
| working length of rolling-heating rolls | 500 mm | |
| diameter of rolling-heating rolls | 250 mm | |
| total contact length at preheating rolls | 1000 mm | |
| (Molding conditions) | | |
| extension ratio | 2 | 3 |
| circumferential speed of preheating rolls (m/min) | 3 | 2 |
| temperature of preheating rolls (°C.) | 90 | 90 |
| circumferential speed of rolling rolls (m/min) | 6 | 6 |
| temperature of rolling rolls (°C.) | 100 | 100 |
| tightening force (Kg/cm) | 250 | 270 |
| width reduction (%) | ▽4 | ▽9 |
| Drawing between nearby rolls | | |

| -continued | | |
|---|---|---|
| (Used rolls) | | |
| working length of rolling-heating rolls | 500 mm | |
| diameter of drawing-heating rolls | 250 mm | |
| distance between nearby rolls | ca. 2 mm | |
| total contact length at preheating rolls | 1000 mm | |
| (Molding conditions) | | |
| extension ratio | 2 | 3 |
| circumferential speed of preheating rolls (m/min) | 6 | 6 |
| temperature of preheating rolls (°C.) | 90 | 90 |
| circumferential speed of slow revolve. rolls (m/mim) | 3 | 2 |
| temperature of slow revolve. rolls (°C.) | 100 | 100 |
| circumferential speed of high revolve. roll (m/min) | 3 | 2 |
| temperature of high speed roll (°C.) | 100 | 100 |
| width reduction (%) | ▽20 | ▽27 |

Measurement of Water Vapor Transmission rate

Water vapor transmission rates were measured at 40° C. and 90% RH in accordance with JIS-Z0222.

Measurement of Crystallites Orientation

Although several crystal planes in HDPE of which the normal are orthogonal or nearly orthogonal to molecular chain axis as defined in the present invention, are measurable with wide angle x-ray diffraction, the pole figures of (200) plane were used to estimate crystallites orientation in the following Examples and Referential examples.

Referential Examples 6 to 7 and Examples 7 to 9

The sample in Referential Example 6 was HPPE extrusion blown film with "a"-axis orientation peculiar to blown film, and in consequence values of the longitudinal half-height width and the equatorial intensity ratio were too low to measure. FIG. 6 gives the (200) pole figure of the film in Referential Example 6.

Figures 7A, 7B:
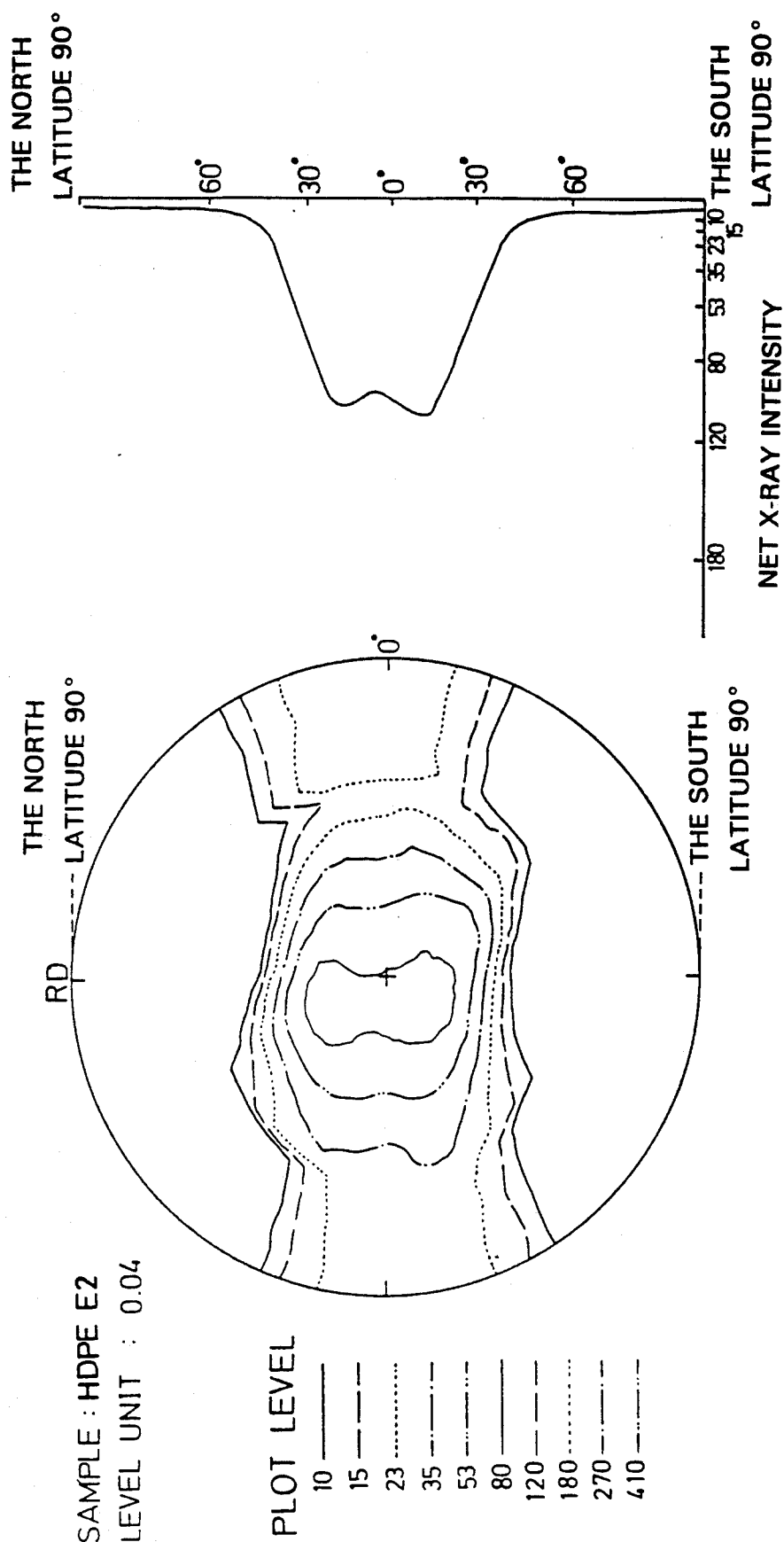

The blown film in Referential Example 6 was drawn two times in length between nearby rolls to give the film in Referential Example 7, of which the (200) pole figure is given in FIG. 7. The longitudinal half-height width was 64°, and the equatorial intensity ratio was 4.

The film in Referential Example 6 was drawn 3 times in extension between nearby rolls to give the film in Example 7, of which the (200) pole figure and the longitudinal profile are provided in FIG. 8. The longitudinal half-height width was 50°, and the equatorial intensity ratio was 5, corresponding to one of the claims of the present invention.

Figure 9:
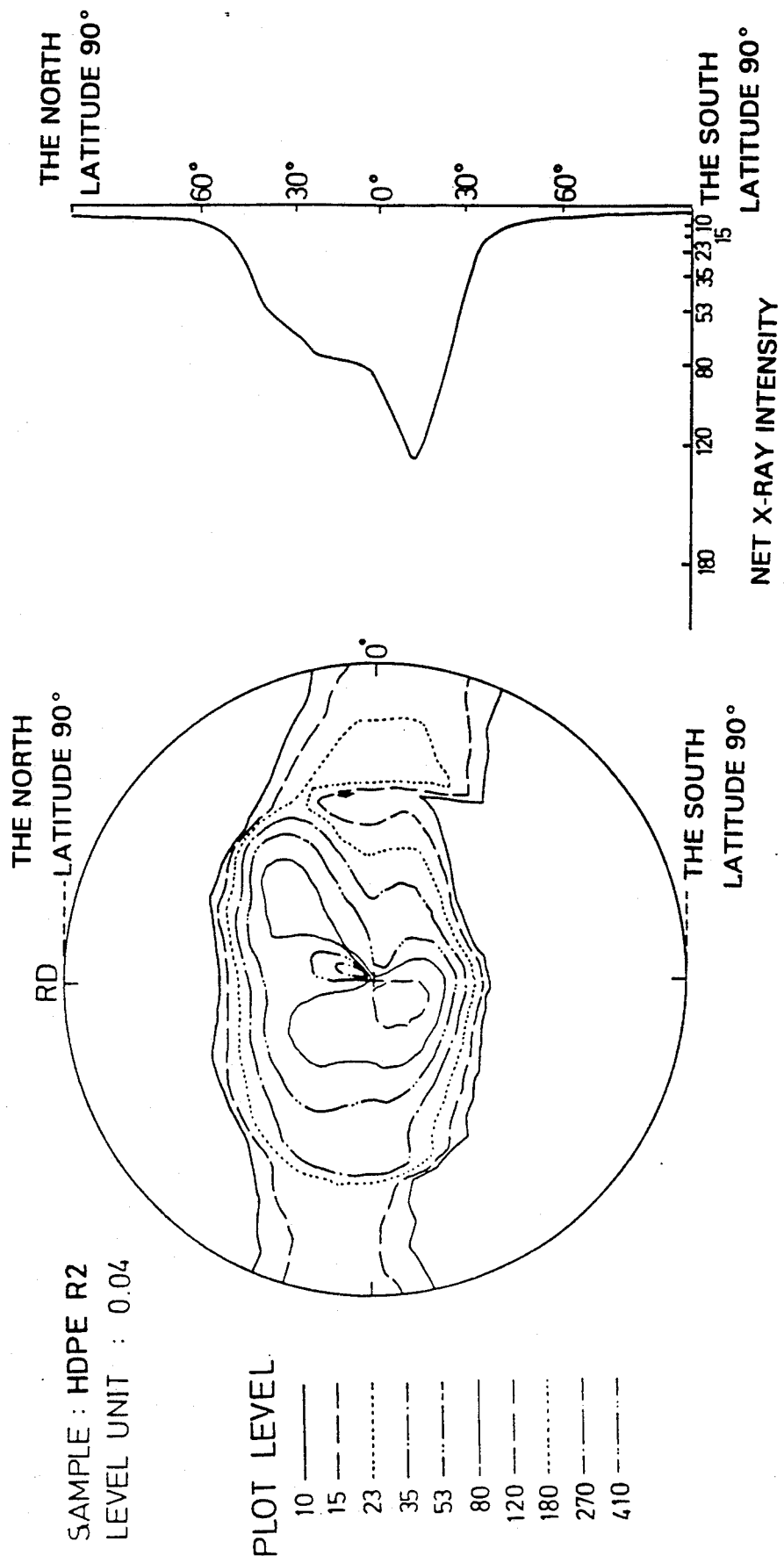

The film in Referential Example 6 was rolled 2 times in length to give the sample in Example 8, of which the (200) pole figure and the longitudinal profile are given in FIG. 9. The longitudinal half-height width was 60°, and the equatorial intensity ratio was 6, corresponding to one of the claims of the invention.

Figures 10A, 10B:
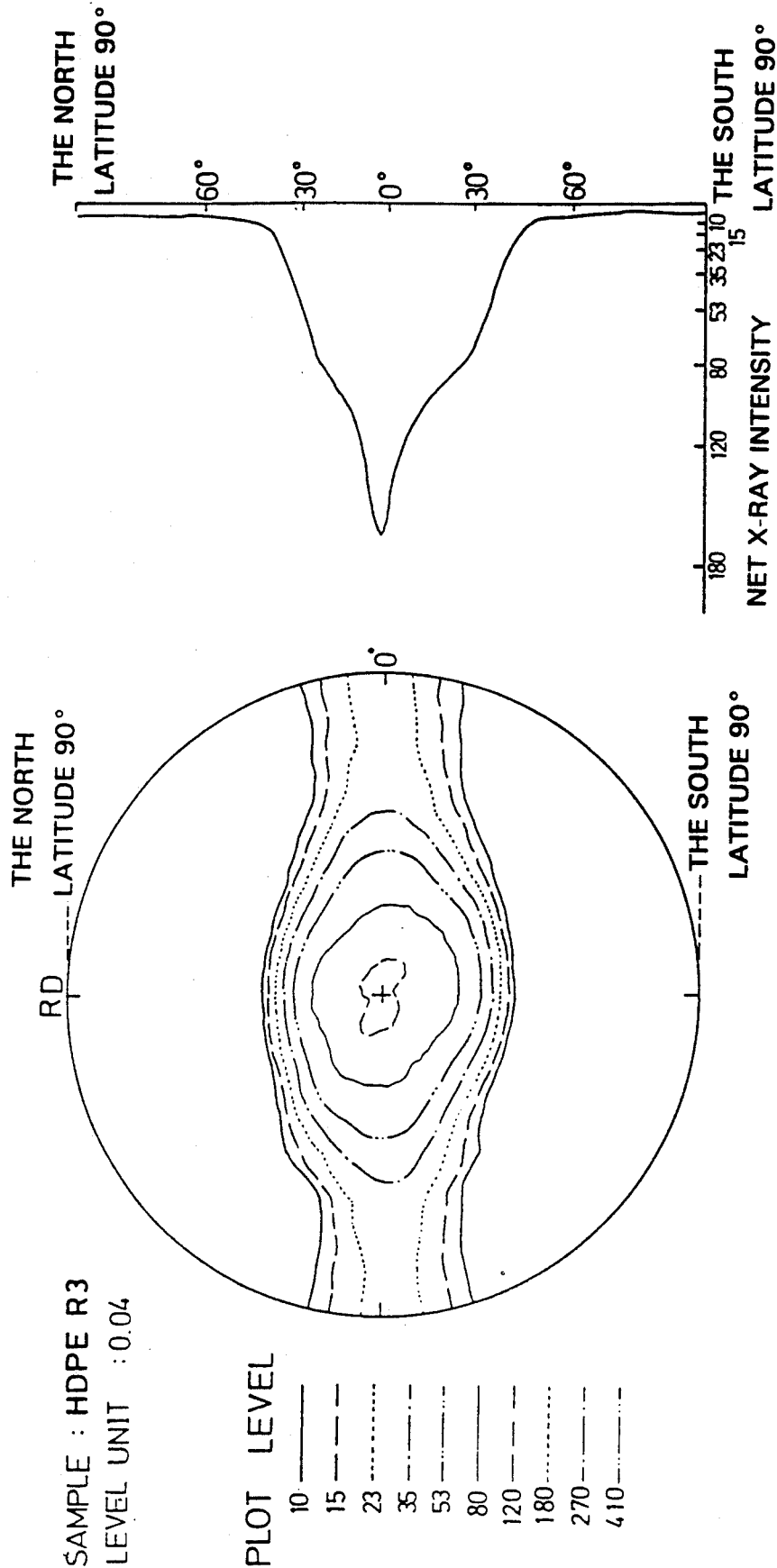

The film in Referential Example 6 was rolled 3 times in length to give the film in Example 9, of which the (200) pole figure and the longitudinal profile are given in FIG. 10.

The longitudinal half-height width was 46°, and the equatorial intensity ratio was 6, corresponding to one of the claims of the invention. Table 4 shows the water vapor transmission rates (WVTR) of the films of Referential Examples 6-7, and Examples 7-9.

TABLE 4

Crystallites Orientation and Water Vapor Transmission Rates of HDPE Films

| | Longitudinal Half-height Width (°) | Equatorial Intensity Ratio | Orientation Degree *2 | Post-Fabrication | Water Vapor Transmission Rates *1 |
|---|---|---|---|---|---|
| Referential Example 6 | — | — | x | None | 10.9 |
| Referential Example 7 | 64 | 4 | x | elongated by 2 times, drawing between nearly rolls | 8.7 |
| Example 7 | 50 | 5 | ⊙ | elongated by 3 times, drawing between nearly rolls | 4.4 |
| Example 8 | 60 | 6 | ○ | rolling 2 times | 6.4 |
| Example 9 | 46 | 6 | ⊙ | rolling 3 times | 3.2 |

*1 (cc-10μ/m²-atm-day) (30° C.-100% RH)
*2 ⊙: Preferable
○: Within the scope of the invention
x: Out of the question

Evaluation

The original blown film in Referential Example 6 showed WVTR of 10.9 (g.10μ/m².day).

The film in Referential Example 7 which underwent drawing to 2 times showed WVTR of 8.7 (g.10μ/m².day). The barrier property was surely improved as compared with Referential Example 6, but not satisfactory enough.

The film in Example 7 which underwent drawing to 3 times showed WVTR of 4.4 (g.10μ/m².day), less than half of that of the film in Referential Example 6. This improvement is considered substantial and of practical significance.

The film in Example 8 which underwent rolling to 2 times and with the longitudinal half-height width of 60° and the equatorial intensity ratio of 6, showed WVTR of 6.4 (g.10μ/m.day). This is a good barrier film of practical significance.

The film in Example 9 which underwent rolling to 3 times and with the longitudinal half-height width 46° and the equatorial intensity ratio of 6, showed WVTR of 3.2 (g.10μ/m.day), less than ⅓ of that of Referential Example 6. This film corresponds to the preferable film defined in one of the claims of the present invention. It will be noteworthy that such an excellent gas barrier is achieved without the help of any annealing process.

Although it is not fully understood what mechanism underlies the present invention, applicants have made several speculations on carrying forward the research. That is, a crystalline thermoplastic resin is composed of crystalline regions where molecules are closely packed in order and non-crystalline regions where molecules are less closely packed with some disorder. As gas permeation occurs almost exclusively in non-crystalline regions, the decrease of the portion of non-crystalline regions, i.e. the increase of crystallinity by any annealing process, may lead to the high gas barrier property.

However, the crystallites orientation effects as evidenced in the present invention surely rely on any other mechanism other than the crystallinity mechanism which are due to the reduction of transport passages. For, as shown in Table 3, the film in Example 3 with uniaxial-uniplanar orientation of crystallites by means of rolling under lower temperature, has high gas barrier property, yet indicates very little density increase, namely, very little increase of the portion of crystalline regions.

One of the speculation on this matter is as follows:

In the macroscopically large extension tensile deformation causing crystallites orientation, microscopically molecules in non-crystalline regions deform from the loosely packed state (maybe somewhat random coil state) to the stretched ordered packed state, and this deformation contributes to hinder the transport of gas molecules.

In other words, in non-crystalline regions with no crystallites orientation, molecules are so loose and flexible that gas molecules are easy to permeate, but at non-crystalline region with crystallites orientation, molecules are a bit stretched and rigid so that the transport of gas molecules may be less easy.

Another speculation is as follows: In the case of uniaxial-uniplanar orientation of crystallites as in the molded articles of the present invention, the crystallographic planes facing the directions of the machine direction, the transverse direction and the thickness direction of the molded articles are nearly fixed, and thus the adjacent crystallites may contact with each other smoothly and easily.

This speculation explains the difference between Example 6 and Referential Example 5, that is, both EVOH molded articles were fully annealed to nearly saturation level, but the one with uniaxial-uniplanar orientation of crystallites was better in gas barrier property.

This speculation also explains the merit of the crystallites orientation as produced by the present invention, that is, the merit to lessen the severity of annealing required, as mentioned in Examples 3–6.

In the case of no crystallites orientation, the growth of crystallites may be hindered at a point of contact with any adjacent crystallites. On the contrary, in the case of uniaxial-uniplanar orientation of crystallites as produced in the present invention, growing crystal surfaces are generally parallel with the adjacent ones, and so the crystallization may proceed with less hindrance and rapidity.

Still another speculation is as follows: At the last stage of crystallization where inerstices between crystallites are minimal, the crystal growth, i.e. the incorporation of molecules into crystal, may be smoother in the case of the surrounding crystallites oriented in the same direction than otherwise. This may explain the difference in the final gas barrier performances after annealing of molded articles with or without achievement of annealing effects in the case of molded articles with uniaxial-uniplanar orientation of crystallites.

Field of Industrial Application

In the present invention, there is provided a molded article of crystalline thermoplastic resin such as films, sheets or containers having high gas barrier property, wherein its crystal molecular chain axis direction orients uniaxially and uniplanarly. Also, there is provided a efficient production thereof economically. Further, there is provided a molded article of crystalline thermoplastic resin with remarkably high gas barrier property, by use of the synergistic enhancing effect of crystallites orientation with crystallinity on gas barrier property.

The high gas barrier resin molded articles of the present invention can be used in various fields such as food packaging, parts packaging, covering materials, protection materials, and the like. One of the preferable forms of the molded articles for such uses is films or sheets.

A film or sheet in itself of the present invention may be used as a primary molded article, and the film or sheet after post-treatment may also be used as a secondary molded article. Typical examples of the secondary molded article include bags or containers which are made from the film through lamination and bag-making, and cups or trays which are made from the sheet through solid molding.

The molded articles according to the present invention have excellent gas barrier property, and they are not only useful as chilled beef packaging materials, but also useful for retort food packaging, pouch packaging, coating and protecting materials for ham and sausages, processed fish, processed seafood products such as boiled fish paste, dried food for sprinkling, soup powder, parched rice cake, curry powder, spices, vegetables, fruits and pharmaceuticals.

We claim:

1. A molded article of crystalline thermoplastic resin with high gas barrier property of which the resin has crystalline and non-crystalline regions, wherein the crystal molecular chain axis direction of crystallites of said crystalline regions orients uniaxially and uniplanarly, and
    wherein the crystallites orientation is characterized by the following (a) and (b):
    (a) the degree of the uniaxial orientation of the crystal molecular chain axis direction is less than 60° in the half-height width of the longitudinal peak, and
    (b) the degree of the uniaxial-uniplanar orientation of the crystal plane which orients in the direction perpendicular to the molecular chain axis is more than 3 in terms of the equatorial intensity ratio, said crystal plane being characteristic of the individual resin.

2. The molded article of crystalline thermoplastic resin with high gas barrier property as claimed in claim 1, wherein the molded article is a membranous material or composite material made therefrom.

3. The molded article of crystalline thermoplastic resin with high gas barrier property as claimed in claim 1, wherein the uniaxial-uniplanar oriented molded article is made by application of extensional stress in one direction in order to cause large uniaxial elongational deformation, and by application of the second stress in the direction perpendicular or nearly perpendicular to the first one in order to minimize the width reduction due to the elongational deformation.

4. The molded article of crystalline thermoplastic resin with high gas barrier property as claimed in claim 3, wherein the uniaxial-uniplanar oriented molded article is made by at least one of the molding methods selected from the group consisting of uniaxial rolling, elongational drawing between nearby rolls, and biaxial drawing.

5. A molded article of crystalline thermoplastic resin with high gas barrier property of which the resin has crystalline and non-crystalline regions, wherein the crystal molecular chain axis direction of the crystalline regions orients uniaxially and uniplanarly, wherein the crystallites orientation is characterized by the following (a) and (b):
    (a) the degree of the uniaxial orientation of the crystal molecular chain axis direction is less than 60° in the half-height width of the longitudinal peak, and
    (b) the degree of the uniaxial-uniplanar orientation of the crystal plane which orients in the direction perpendicular to the molecular chain axis is more than 3 in terms of the equatorial intensity ratio, said crystal plane being characteristic of the individual resin, and wherein the molded article is further annealed to increase the crystallinity of the resin.

6. The molded article of crystalline thermoplastic resin with high gas barrier property as claimed in claim 5, wherein the post-annealing temperature is more than 10° C. lower than the crystalline melting point of the resin.

7. The molded article of crystalline thermoplastic resin with high gas barrier property as claimed in claim 1 wherein the resin is selected from the group consisting of ethylene-(vinyl alcohol) copolymer resins, poly (vinyl alcohol) resins, polyethylene resins, polypropylene resins, polyamide resins, polyester resins, poly (vinylidene chloride) resins, and mixtures thereof.

8. A method of making a crystalline thermoplastic resin molded article with high gas barrier property of which the resin has crystalline and non-crystalline regions, said method comprising orienting the crystal molecular chain axis direction of crystallites of the crystalline regions uniaxially and uniplanarly under a temperature lower than the melting point of the crystalline regions and higher than the glass transition point of the non-crystalline regions by a method for achieving such uniaxial-uniplanar crystallites orientation, such that;
    (a) the degree of the uniaxial orientation of the crystal molecular chain axis direction is less than 60° in the half-height width of the longitudinal peak, and
    (b) the degree of the uniaxial-uniplanar orientation of the crystal plane which orients in the direction perpendicular to the molecular chain axis is more than 3 in terms of the equatorial intensity ratio, said crystal plane being characteristic of the individual resin.

9. A method as claimed in claim 8, wherein the molded article is a membranous material or a composite material made therefrom.

10. A method as claimed in claim 8, wherein the method for achieving uniaxial-uniplanar crystallites orientation comprises applying extensional stress in one direction in order to cause large uniaxial elongational deformation, and applying the second stress in the direction perpendicular or nearly perpendicular to the first one in order to minimize the width reduction due to the elongational deformation.

11. A method as claimed in claim 10, wherein the method for achieving uniaxial-uniplanar crystallites orientation is at least one of the molding methods selected from the group consisting of uniaxial rolling, elongational drawing between nearby rolls, and biaxial drawing.

12. A method of making a crystalline thermoplastic resin molded article with high gas barrier property of which the resin has crystalline and non-crystalline regions, said method comprising orienting the crystal molecular chain axis direction of crystallites of the crystalline regions uniaxially and uniplanarly under a temperature lower than the melting point of the crystalline regions and higher than the glass transition point of the non-crystalline regions by a method for achieving such uniaxial-uniplanar crystallites orientation, such that;
  (a) the degree of the uniaxial orientation of the crystal molecular chain axis direction is less than 60° in the half-height width of the longitudinal peak, and
  (b) the degree of the uniaxial-uniplanar orientation of the crystal plane which orients in the direction perpendicular to the molecular chain axis is more than 3 in terms of the equatorial intensity ratio, said crystal plane being characteristic of the individual resin, and further annealing the molded article to increase the crystallinity of the resin, and increasing the crystallinity of the resin by a method for increasing the proportion of the crystalline regions of the resin.

13. A method as claimed in claim 12, wherein the method for increasing the proportion of the crystalline regions is annealing.

14. A method as claimed in claim 8 wherein the resin is selected from the group consisting of ethylene-(vinyl alcohol) copolymer resins, poly (vinyl alcohol) resins, polyethylene resins, polypropylene resins, polyamide resins, polyester resins, poly (vinylidene chloride) resins, and mixtures thereof.

* * * * *